United States Patent Office 3,516,531
Patented June 23, 1970

3,516,531
DEVICE FOR AUTOMATIC CHARGING OF DEFIBRER MAGAZINES WITH PULPWOOD
Adolf Pinkhusovich Sinyavsky, Ul. B. Porokhovskaya 46, kv. 50, and Viktor Alexandrovich Bedeker, V.O. 10 linia 43, kv. 35, both of Leningrad, U.S.S.R.
Filed Mar. 21, 1968, Ser. No. 714,875
Claims priority, application U.S.S.R., Mar. 30, 1967, 1,144,099
Int. Cl. B65g 47/24
U.S. Cl. 198—33                3 Claims

ABSTRACT OF THE DISCLOSURE

A pulpwood feed device comprises a conveyor for transporting pulpwood through hatches in a frame to a plurality of defibrer magazines positioned beneath the hatches, each magazine having a distributor device thereabove for selective distribution of the pulpwood to left and right half portions of the magazine. Each magazine has two pivotal gates inside the magazine, one in each of the left and right half portions and a wedge-shape guide member is disposed beneath the gates with its pointed edge directed downwards to orient the pulpwood in the associated magazine as it passes the gates.

---

The present invention relates to devices used in the woodworking industry and, more particularly, to continuous-action devices for automatic charging of defibrer magazines with pulpwood for processing the latter into pulp.

Known in the art are devices for automatic charging of defibrer magazines with pulpwood, in which pulpwood is charged by means of a horizontal conveyor disposed above the defibrer magazines and displacing pulpwood along a guide frame having openings or hatches above the defibrer magazines, said hatches being closed with movable gates disposed at the same level with other movable gates used for half-closing the hatches, inclined gates serving as dampers being disposed under the latter gates and used for feeding pulpwood to either the right-hand or left-hand side of the magazines.

This device does not provide for pulpwood orientation parallel to the defibrer stone longitudinal axis, required in accordance with the technological process of pulp production and which until now has been carried out manually.

It is an object of the present invention to eliminate the above disadvantage of the known devices, and to provide a device which ensures oriented stacking of pulpwood in the magazines.

This object is achieved by the arrangement wherein the device for automatic charging of defibrer magazines with pulpwood, in which pulpwood is charged by means of a horizontal conveyor disposed above the defibrer magazines and transferring pulpwood along a guide frame located directly under this conveyor and having hatches above the magazines, there is provided according to this invention guide members disposed under the hatches and fashioned as wedges with their pointed sides directed downwards and located along the defibrer stone longitudinal axis.

Figure 1:
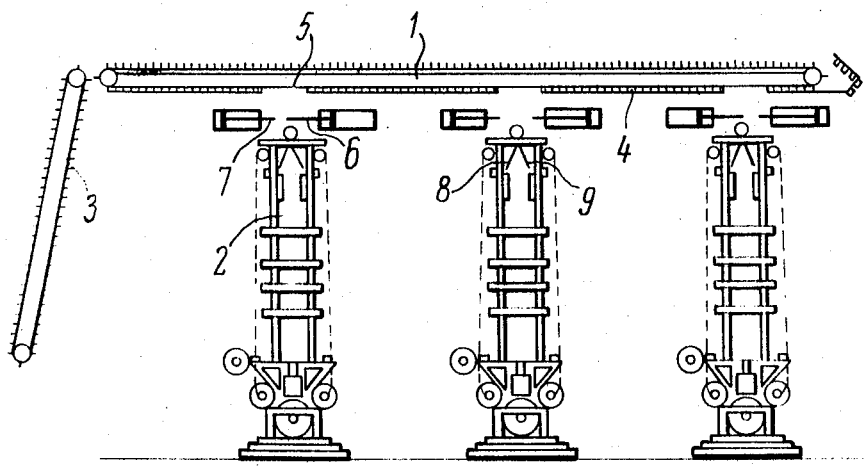
Figure 2:
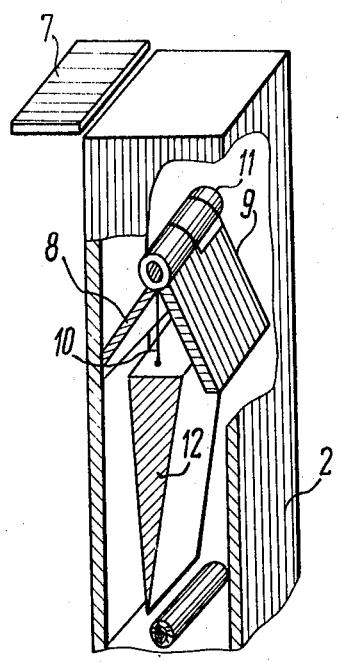

Given below is a detailed description of an exemplary embodiment of the invention with reference to the accompanying drawings, FIG. 1 shows a side view of a device for automatic charging of defibrer magazines with pulpwood, in accordance with the present invention; and FIG. 2 shows in perspective a wedge-shaped guide member, disposed inside the defibrer magazine.

The device for automatic charging of defibrer magazines with pulpwood comprises a horizontal charging conveyor 1 (FIG. 1) disposed above defibrer magazines 2; an inclined conveyor 3 supplying pulpwood to the conveyor 1 and a guide frame 4 located directly under the charging conveyor 1. The guide frame 4 has hatches 5 disposed above the defibrer magazines 2. The hatches 5 are closed by movable gates 6, positioned at the same level with other movable gates 7 for selectively closing the left or right half of the opening to the underlying gates in a manner well known as shown in U.S. Pat. 3,342,351. The operation of gates 6 is also shown in the aforesaid patent. Disposed under the gates 6 and 7 and inside the magazines 2 are inclined gates constituted as dampers 8 and 9 (FIG. 2), having a guide member 12 suspended thereunder on ropes 10 from a hinge 11 of the dampers 8–9 and fashioned as a wedge with its pointed side directed downwards and disposed along the defibrer stone longitudinal axis (not shown in the drawing).

Pulpwood transferred by the conveyor 1 along the guide frame 4, is delivered, with the gates 6 opened, through the hatches 5 into the defibrer magazines 2 and, depending on the position of the gates 7, is directed either to the left-hand 8 or right-hand inclined dampers. Sliding off the dampers 8 and 9, the pulpwood, owing to the wedge-like shape of the guide member 12 and its appropriate disposition with respect to the defibrer stone, assumes in the magazines a position approximately parallel to the defibrer stone longitudinal axis.

What we claim is:

1. A device for automatic charging of defibrer magazines with pulpwood, said device comprising a horizontal conveyor disposed above the defibrer magazines for transport of pulpwood; a guide frame with hatches arranged above said defibrer magazines; said frame being positioned directly under said conveyor for receiving pulpwood therefrom; means for each magazine for controlling admission of pulpwood to left and right half portions thereof; inclined gates in said magazines at said left and right half portions thereof, and a single guide member disposed under said gates inside each of the defibrer magazines, each said guide members being of wedge shape and narrowing downwards to orient the pulpwood admitted to the associated magazine and passing said gates.

2. A device as claimed in claim 1 comprising a hinge supporting said inclined gates in each magazine, and means suspending one of said guide members from each hinge in the associated magazine.

3. A device as claimed in claim 2 wherein said means suspending the guide members comprises rope means.

References Cited

UNITED STATES PATENTS 3,342,351    9/1967    Sinjavsky _____ 198—69

FOREIGN PATENTS 812,888    2/1937    France.

RICHARD E. AEGERTER, Primary Examiner